G. W. GENTRY.
GUIDE LEVER FOR RIDING CULTIVATORS.
APPLICATION FILED AUG. 29, 1917.
1,286,585.
Patented Dec. 3, 1918.
5 SHEETS—SHEET 1.
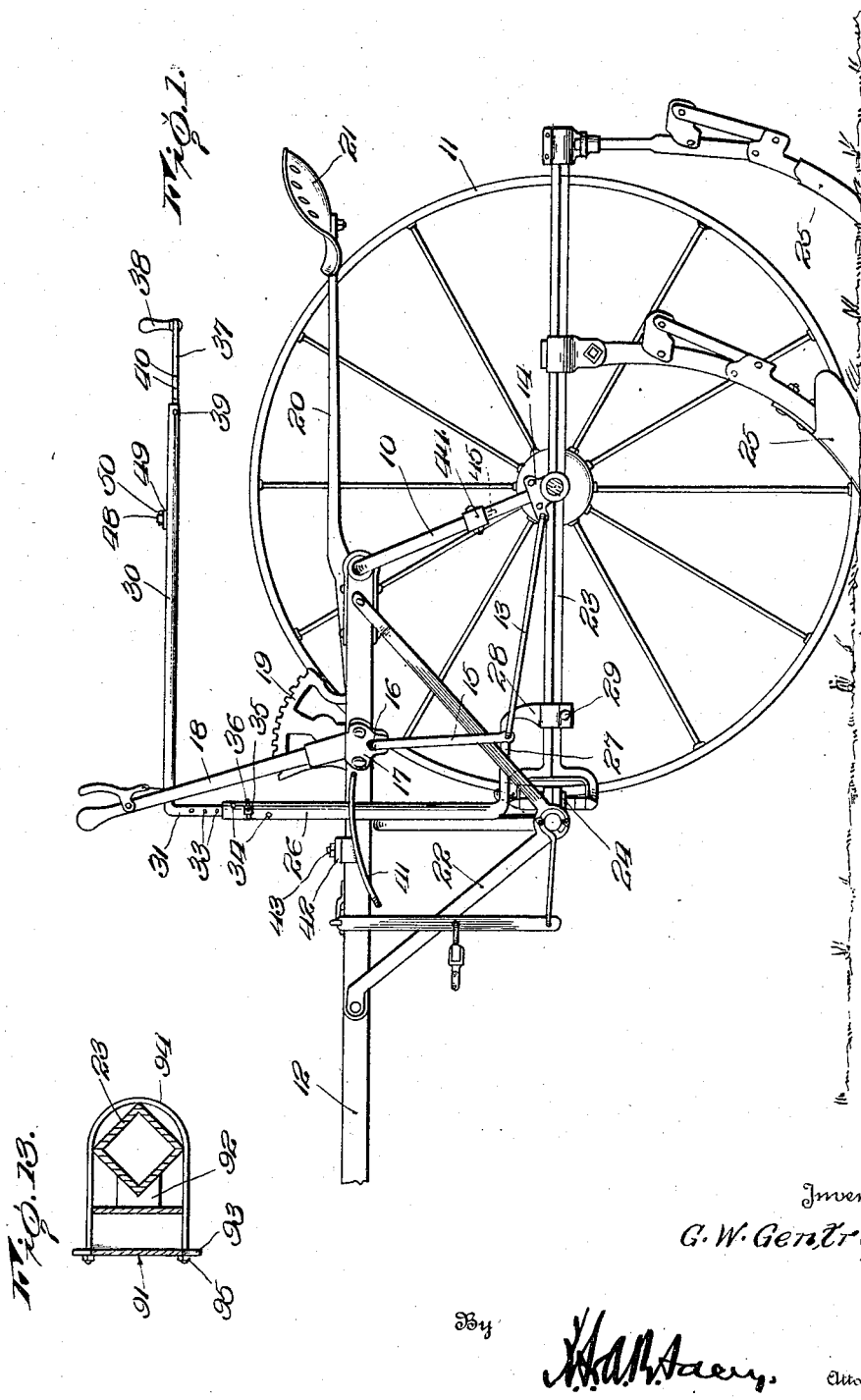
Inventor
G. W. Gentry.
By
Attorneys.

G. W. GENTRY.
GUIDE LEVER FOR RIDING CULTIVATORS.
APPLICATION FILED AUG. 29, 1917.
1,286,585.
Patented Dec. 3, 1918.
5 SHEETS—SHEET 2.
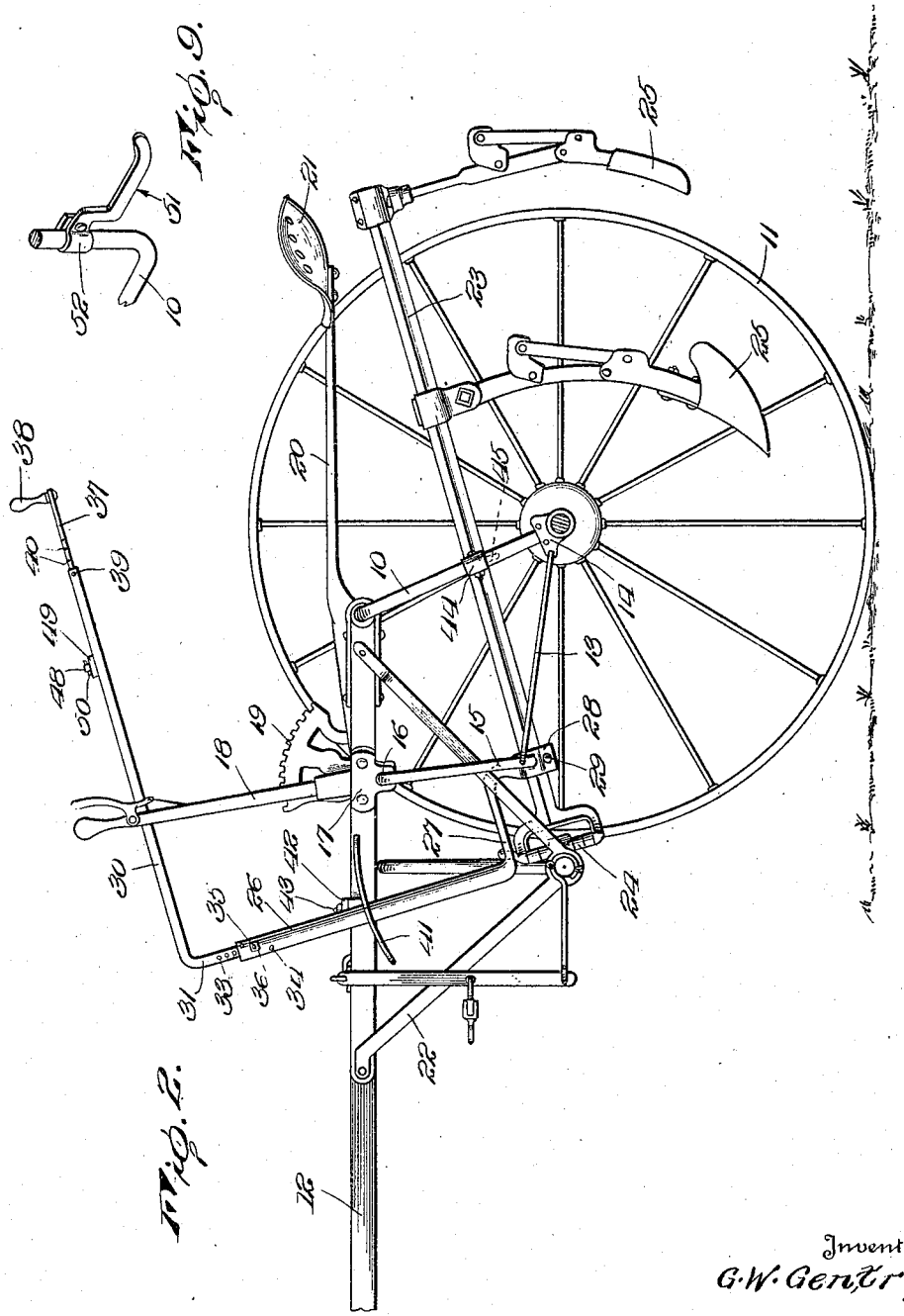
Inventor
G. W. Gentry.

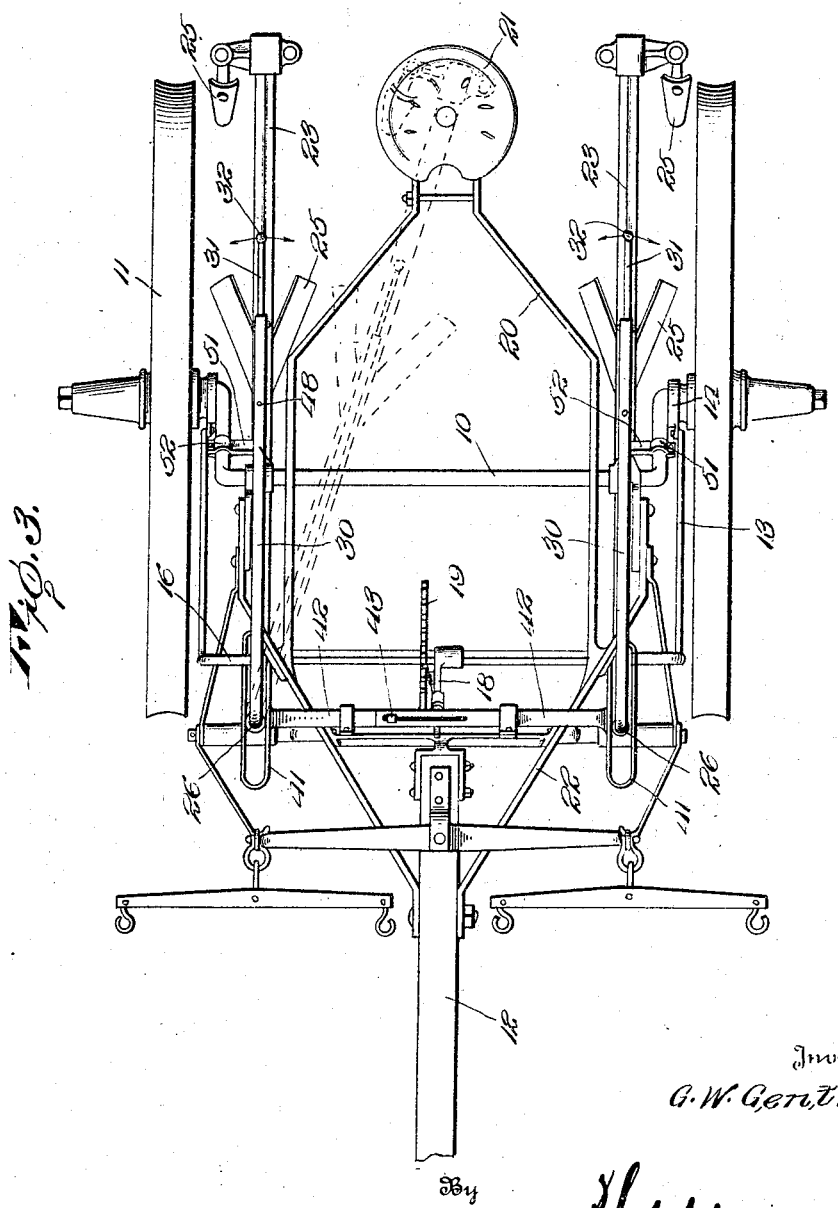

G. W. GENTRY.
GUIDE LEVER FOR RIDING CULTIVATORS.
APPLICATION FILED AUG. 29, 1917.
1,286,585.
Patented Dec. 3, 1918.
5 SHEETS—SHEET 4.
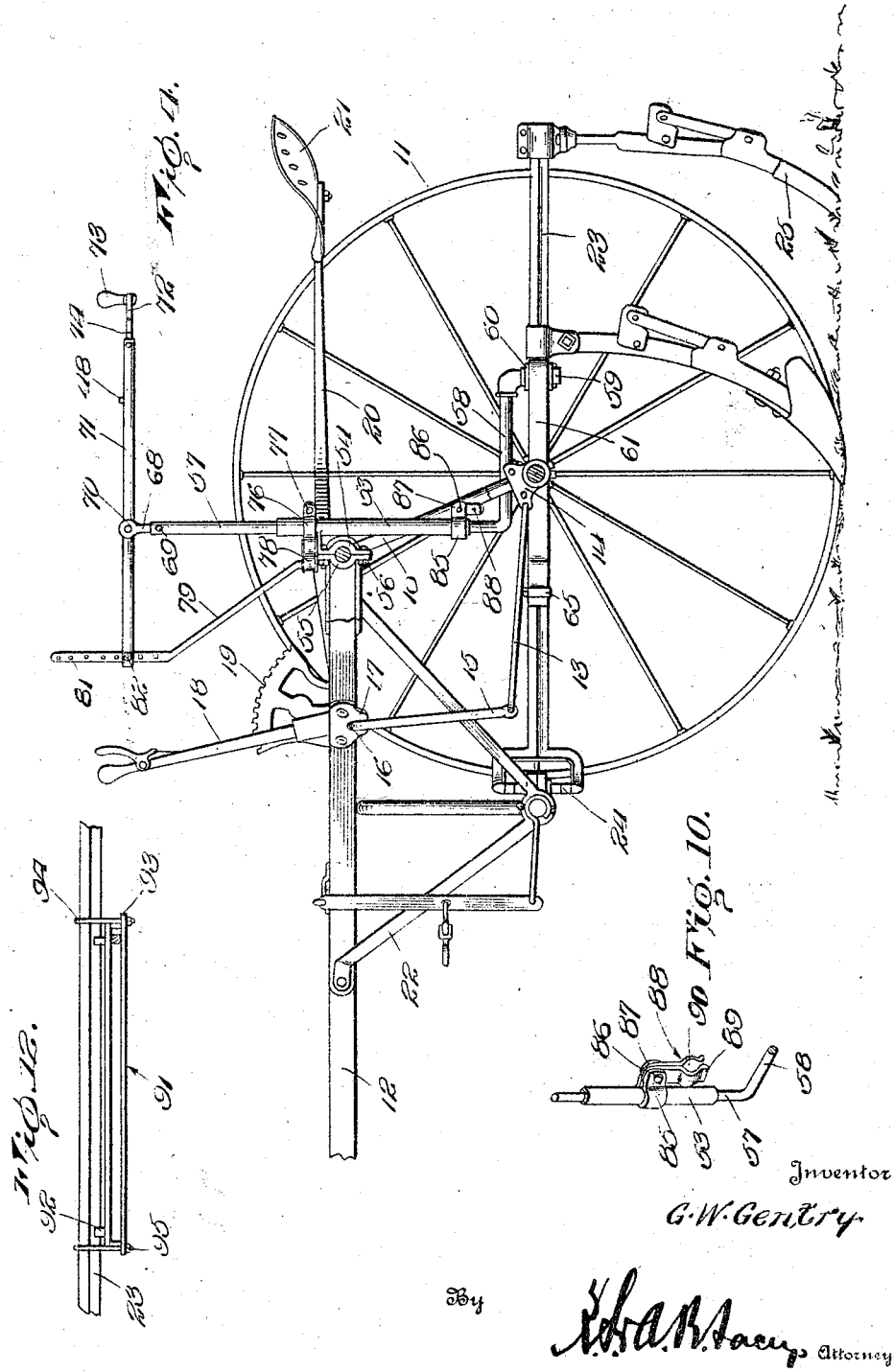
Inventor
G. W. Gentry
By
Attorneys

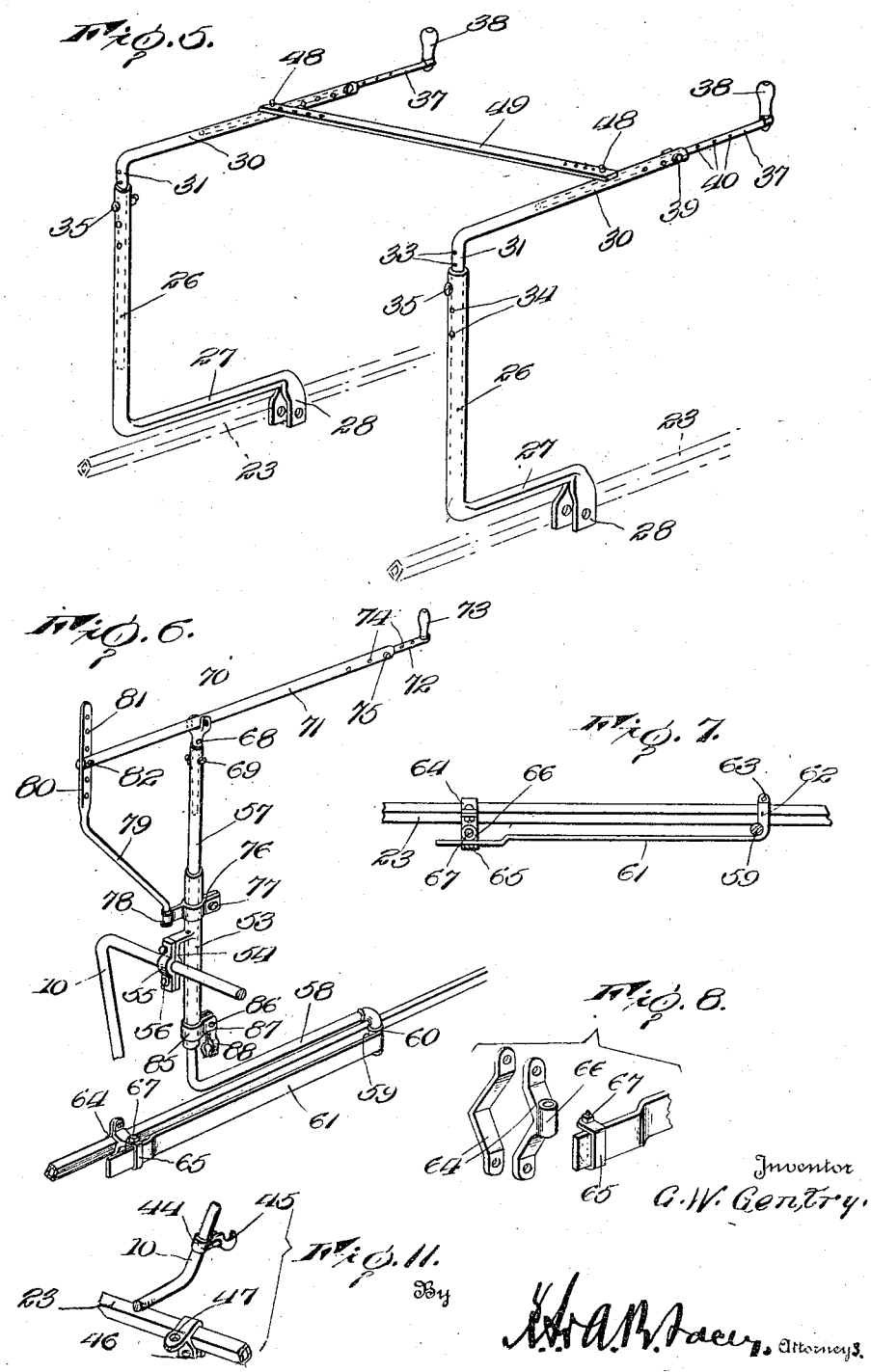

UNITED STATES PATENT OFFICE.

GEORGE W. GENTRY, OF HOLDENVILLE, OKLAHOMA.

GUIDE-LEVER FOR RIDING-CULTIVATORS.

1,286,585.  Specification of Letters Patent.  Patented Dec. 3, 1918.

Application filed August 29, 1917. Serial No. 188,795.

*To all whom it may concern:*

Be it known that I, GEORGE W. GENTRY, a citizen of the United States, residing at Holdenville, in the county of Hughes and State of Oklahoma, have invented certain new and useful Improvements in Guide-Levers for Riding-Cultivators, of which the following is a specification.

My invention relates to new and useful improvements in riding cultivators and has for its primary object the provision of a novel and efficient controlling mechanism for the cultivator blade carrying beams.

More specifically the chief object of this invention resides in the provision of a suitable hand lever for each beam, each hand lever being so connected to the beam that it may be manipulated to raise or lower the free end of the beam or to swing it to the right or left at will.

A still further object of my invention is to so construct, arrange and mount these controlling levers that they will be within easy reach of the operator when he is seated on the cultivator so that if at all necessary he may keep his hands upon the levers at all times and still be in a comfortable position and one from which he can see the work being accomplished.

Another object which I have in view is to construct the controlling mechanism so that it may be adjustable to adapt it for use by men and children with equal facility and to proportion the lever arms of the mechanism so that but little effort will be required for any of the operations in order that a child may operate the cultivator with ease.

With these and other objects in view, my invention will be more fully described, illustrated in the accompanying drawings and then specifically pointed out in the claims which form a part of this application.

In the drawings:

Figure 1 is a side elevation, partially in section of a conventional form of riding cultivator showing my invention applied thereto, the parts which my invention replaces being omitted;

Fig. 2 is a corresponding view illustrating the cultivator blade carrying beam in raised position;

Fig. 3 is a plan view showing both beams and their controlling levers, one of the beams being shown in a second position in dotted lines;

Fig. 4 is a view corresponding to Fig. 1 illustrating a modified form of construction;

Fig. 5 is a perspective view of the form of attachment shown in Figs. 1 to 3 of the drawings;

Fig. 6 is a fragmentary perspective view illustrating certain details of the other form of my invention;

Fig. 7 is a sectional view illustrating a guideway employed in this latter form of invention;

Fig. 8 is a fragmentary perspective view of one of the clamps securing the guideway in place;

Fig. 9 is a fragmentary perspective view of a plow beam supporting stirrup;

Fig. 10 is a corresponding view of a modified form of beam support;

Fig. 11 is a corresponding view of a still further modified form of beam support.

Fig. 12 is a plan view; and Fig. 13 a transverse sectional view showing a modified form of guide-way.

Corresponding and like parts are referred to in the following description and indicated in all the views of the drawings by the same reference characters.

In order to insure a clear and accurate understanding of my invention, its application and use I have illustrated it in connection with a conventional form of riding cultivator including the usual U-shaped axle 10 carrying at its ends the ground wheels 11. The rear end of the tongue 12 is secured to a tongue frame which is connected with the intermediate portion of the axle for vertical swinging movement and links 13 connected to brackets 14 upon the axle adjacent the wheels are connected to the ends of crank arms 15 of a shaft 16 journaled in a bearing 17 carried by the tongue and locked in adjusted position by a hand lever 18 having a latch coöperating with the notched sector 19. By this construction the inclination of the depending side portions of the axle 10 to the horizontal may be adjusted at will. Projecting from the rear end of the tongue frame is a seat standard, or bracket 20 carrying the usual seat 21, and depending from the tongue in advance of the shaft 16 is a bracket 22 to which are connected the forward ends of the beams 23 by joints 24 which permit of the beams being swung either laterally or vertically at will. These beams support a plurality of cultivator plows or shovels 25 of the usual or any preferred type, and my present invention resides in the provision of a novel means for accomplishing the lateral and vertical swinging of the beams to permit proper handling of the plows or shovels during use of the cultivator.

My invention aims to provide a single handle or lever for each beam and to so dispose the handles or levers that they may be readily grasped by the operator when occupying his natural position in the seat. In accomplishing this I provide a pair of standards 26 each of which is formed with a rearwardly directed arm 27 at its lower end having a depending terminal 28 which is forked to embrace one of the beams 23 at a point slightly at the rear of the joint 24. Any suitable clamping means such as a nut and bolt 29 is employed to secure the beam in the forked terminal of its standard and the arms 27 are so proportioned that in normal horizontal position of the beams the standards extend substantially vertically and in substantial vertical alinement with the pivot points of the beams, the arms 27 being disposed in parallel spaced relation to the adjacent terminals of the beams. The standards may be constructed of any suitable material and in any desired manner but they are preferably, at least at their upper ends, tubular and coöperating with each standard is a lever arm 30 having a depending terminal 31 projecting at right angles and telescoping within the upper end of the corresponding standard 26. This terminal is provided at spaced intervals with openings 33 and the upper portion of the standard is provided with a number of diametrically disposed pairs of openings 34, the pairs of openings being disposed at various angles to each other as shown in Fig. 1. A bolt 35 is passed through one pair of openings of each standard and through one of the openings 33 of the depending terminal 31 of the lever 30 and is secured by a nut 36. Obviously, by this means it is possible to adjust the lever arm 30 to any desired height within reasonable limits and also to adjust it to project either parallel with the plow beam or slightly outwardly or inwardly as preferred.

The lever arms 30 may also be of any material and construction desired but are preferably at least at their free rear ends of tubular construction to receive the shanks 37 which carry upwardly directed handles 38. A bolt 39, pin or other suitable means is passed through each lever arm 30 near its rear end and through one or the other of a series of openings 40 formed in the shank 37 so that the handles may be adjusted toward and away from the standards 26 to bring them at any desired distance from the driver's seat. In order to support the standards against any tilting action save toward the front and rear, which is desired, I provide a pair of slotted guideways 41 in the form of elongated eyes formed upon the ends of overlapping plates or bars 42 which are clamped to the tongue and which are secured in adjusted position with respect to each other by bolts and nuts 43 so that the guideways may be located at any desired distance at either side of the tongue according to the setting of the beams 23 which, as is usual are mounted so that they may be adjusted toward and away from each other.

Each of the depending portions of the axle 10, adjacent its lower end carries a clamping sleeve 44 having a hook 45, and each beam at a suitable point carries a clamping sleeve 46 having an eye 47 engageable with the hook when the beam is properly elevated. By this means either or both of the beams may be supported with the plows or shovels well out of engagement with the ground while the machine is being turned at the end of a row or while it is being drawn to and from the field.

In some instances, such as in preparing furrows for planting it is desirable that the plows of one beam be maintained at an absolutely uniform distance from those of the other beam and for this reason I provide each of the hand levers 30, preferably near its rear end, with an upstanding stud 48, these studs being adapted to seat in one or another of a series of perforations formed in spaced relation in the end portions of a hobble bar 49 of wood, metal or other suitable material. The studs may be pierced to receive cotter pins 50 to prevent accidental displacement of the hobble bar if desired. Obviously, with this arrangement the hand levers may be secured in spaced relation to each other and at any desired distance, within reasonable limits, to correspondingly space and hold the plow or shovel carrying beams.

In the foregoing description, taken in connection with the drawings, the operation of my improved cultivator attachment will be readily understood. The driver or operator of the cultivator will, of course, occupy the seat in the usual manner but instead of having to manipulate the usual hand lifting levers and plow directing handles he will merely grasp the handles 38 or other parts of the two hand levers 30 in each hand under which circumstances he will have direct and easy control over all movement of both plow beams. If the plows are to be raised or lowered the hand levers will be lifted or pressed down while inward or outward swinging of either or both of the hand levers will cause inward or outward swinging of the corresponding beam or beams. Because of the leverage obtained but little effort is required in this manipulation of the plow beams and the operation of the plows of each beam, both as regards spacing toward and from the rows being cultivated and as regards the depth of cut the plows may be readily and independently controlled.

If desired stirrups 51 having clamping sleeves 52 may be attached by the sleeves to the depending portions of the axle 10 to form foot rests for the driver and also to form supports for the plow beams when they are elevated. If these stirrups are provided the hook and eye members 45 and 47 are omitted.

In Figs. 4 and 6 to 8 and 10 of the drawings I have illustrated a somewhat modified form of attachment. As there shown a pair of supporting sleeves or cuffs 53 are provided intermediate their length with half-bearings 54 which with coöperating half-bearings 55 and bolts 56 serve to connect the sleeves to the intermediate portion of the rear axle 10 to support the sleeves in vertical position. Standards 57 are reciprocally mounted in these sleeves and are provided at their lower ends with rearwardly directed lifting arms 58, which are preferably integrally formed with the standards and which have downwardly directed terminals 59 having spaced bearing collars 60. A guide member 61 in the form of a bar of metal has one end bifurcated and laterally bent to form clamping arms 62 which encircle the plow beam and which are secured by a bolt and nut 63. The opposite end of this strip is offset and is secured to a clamp 64, secured about the beam, by a clevis 65. This clamp forms part of the regular cultivator equipment and has a sleeve 66 through which the bolt 67 of the clevis is passed. The terminals 59 of the lifting arms 58 of the standards 57 slide between the beams and the guide strips 61 and are held against disengagement by the collars or abutments 60.

The upper ends of the standards 57 are preferably tubular to receive a telescopic standard section 68 and are pierced with a series of diametric openings corresponding to the openings 34 to receive a bolt 69 by which the telescopic sections 68 are adjustably secured. The upper ends of the sections 68 are forked as shown at 70, to receive the hand levers 71 the rear ends of which telescopically receive the shank 72 of the handles proper 73. These shanks and the adjacent ends of the levers 71 are formed with a series of openings 74 to receive a bolt 75 by which the length of the levers between the forks 70 and handles 73 may be varied.

Split sleeves 76 are clamped about the sleeves or cuffs 53 adjacent their upper ends by bolts 77 and are formed with forwardly projecting bearings 78 which swivelly receive the ends of pivot brackets 79. These brackets are each formed with a vertically disposed free terminal 80 having a series of openings 81 to receive a pivot bolt 82 passed through any one of the openings and the free forward end of the adjacent lever arm 71. Obviously, these pivot bolts form fulcrums for the lever arms 71 so that lifting or lowering of the lever arms will cause raising and lowering of the standards 57 and, consequently, of the beams carrying the plow or shovel blades. At the same time because of the swivel connection between the brackets 79 and the cuffs 53 and because of the sliding engagement between the terminals of the lifting arms 58 and the beams the lever arms 71 may be swung in or out to swing the beams toward or away from each other. Obviously, therefore, the operation of this form of attachment is the same as that of the form previously described.

With this form of attachment split clamping sleeves 85 are secured about the lower portions of the cuffs 53 by bolts 86 passed through their ears 87. The ends of spring clips 88 are clamped between these ears by the same bolt and the free end of the clips depend downwardly being outcurved somewhat as shown at 89, to facilitate admission of the lifting arms 58 upon raising of such arms into the spaces 90 formed by outwardly bowing the intermediate portions of the clips. It will, of course, be understood that when the lifting arms are raised, the plow beams are raised and are engaged between the clips, they being held in raised position and the plows being supported in inactive position.

In place of the guide-ways shown in Figs. 6 and 7, I may employ the guide-way shown in Figs. 12 and 13, which includes a rectangular frame 91 open at its top and bottom and having one wall provided at its ends with notched lugs 92 for engagement against the beam to which the guide-way is to be attached. The forward wall of this guide-way, at its corners, is formed with projecting ears 93 to receive the threaded arms of U-shaped clamping bolts 94 which, together with nuts 95, serve to secure the guide to the inner face of the beam. Obviously, this guide may be applied to beams of all cross-sectional shapes, the notched lugs receiving cylindrical beams or being omitted if the device is to rest against the flat side of a beam.

Having thus described the invention, what is claimed as new is:

1. In a cultivator attachment the combination with a wheeled cultivator having a frame, a plow beam supported at its forward end by the frame for swinging movement both horizontally and vertically, and a seat, of a single hand lever supported by the frame and having operative engagement with the beam whereby swinging of the hand lever in any direction, either horizontally or vertically, will cause corresponding movement of the beam, the hand lever being adjustable both as regards height and rearwardly and forwardly respectively toward and away from the seat.

2. In an attachment for cultivators the combination with a wheeled cultivator including, a frame, a seat mounted upon the frame, and plow beams supported at their forward ends by the frame for swinging movement toward and away from each other and for swinging movement up and down, of hand levers supported by the frame and having operative engagement with the beams whereby any movement of either hand lever will cause corresponding movement of its beam, each hand lever including a standard portion supported by the frame for forward and rearward swinging movement, a hand lever portion projecting rearwardly from the upper portion of the standard to a point adjacent the seat and a lifting arm portion extending rearwardly from the lower end of the standard and having connection with the adjacent beam.

3. In an attachment for cultivators the combination with a wheeled cultivator including a frame, a seat mounted upon the frame, and plow beams supported at their forward ends by the frame for swinging movement toward and away from each other and for swinging movement up and down, of hand levers supported by the frame and having operative engagement with the beams whereby any movement of either hand lever will cause corresponding movement of its beam, each hand lever including a standard portion supported by the frame for forward and rearward swinging movement, a hand lever portion projecting rearwardly from the upper portion of the standard to a point adjacent the seat and a lifting arm portion extending rearwardly from the lower end of the standard and having connection with the adjacent beam, the hand lever portion being adjustable vertically with respect to the standard portion.

4. In an attachment for cultivators the combination with a wheeled cultivator including, a frame, a seat mounted upon the frame, and plow beams supported at their forward ends by the frame for swinging movement up and down, of hand levers supported by the frame and having operative engagement with the beams whereby any movement of either hand lever will cause corresponding movement of its beam, each hand lever including a standard portion supported by the frame for forward and rearward swinging movement, a hand lever portion projecting rearwardly from the upper portion of the standard to a point adjacent the seat and a lifting arm portion extending rearwardly from the lower end of the standard and having connection with the adjacent beam, the hand lever portion being adjustable vertically and angularly with respect to the standard portion.

5. In an attachment for cultivators the combination with a wheeled cultivator including a frame, a seat mounted upon the frame, and plow beams supported at their forward ends by the frame for swinging movement up and down, of hand levers supported by the frame and having operative engagement with the beams whereby any movement of either hand lever will cause corresponding movement of its beam, each hand lever including a standard portion supported by the frame for forward and rearward swinging movement, a hand lever portion projecting rearwardly from the upper portion of the standard to a point adjacent the seat and a lifting arm portion extending rearwardly from the lower end of the standard and having connection with the adjacent beam, the hand lever portion being adjustable vertically and angularly with respect to the standard portion, and the hand lever portion being adjustable in length.

6. In an attachment for cultivators the combination with a wheeled cultivator including a frame, a tongue connected to the frame, a seat mounted upon the frame, and plow beams supported at their forward ends by the frame for both vertical and lateral swinging movement, of guideways supported by the tongue at either side thereof and adjustable toward and away from each other, standards freely mounted in the guideways and formed with laterally directed lower ends having depending terminals connected to the beams, and rearwardly directed hand levers having fixed connection with the upper ends of the standards whereby any movement of the hand levers will cause corresponding movement of the standards.

7. In an attachment for cultivators the combination with a cultivator including a frame, a tongue connected to the frame, and plow beams supported at their forward ends by the frame for both vertical and lateral swinging movement, of guideways supported by the tongue at either side thereof and adjustable toward and away from each other, standards freely mounted in the guideways and formed with laterally directed lower ends having depending terminals connected to the beams, rearwardly directed hand levers having fixed connection with the upper ends of the standards whereby any movement of the hand levers will cause corresponding movement of the standards, and means for supporting the beams in raised position.

8. In an attachment for cultivators the combination with a cultivator including a frame, and plow beams supported at their forward ends by the frame for both vertical and lateral swinging movement, of vertically disposed sleeves supported by the frame, standards reciprocally mounted in the sleeves, rearwardly directed lifting arms rigid with the lower ends of the standards and having sliding connection with the beams, brackets having swivel connection with the sleeves, and hand levers pivoted at their forward ends to the brackets and having pivotal connection with the upper ends of the standards.

9. In an attachment for cultivators the combination with a cultivator including a frame, and plow beams supported at their forward ends by the frame for both vertical and lateral swinging movement, of vertically disposed sleeves supported by the frame, standards reciprocally mounted in the sleeves, rearwardly directed lifting arms rigid with the lower ends of the standards and having sliding connection with the beams, brackets having swivel connection with the sleeves, and hand levers pivoted at their forward ends to the brackets and having pivotal connection with the upper ends of the standards, the hand lever being adjustable in length, the standards adjustable in height and the hand levers having adjustable connection with the brackets whereby the disposition of the free ends of the hand levers may be varied at will.

10. In an attachment for cultivators the combination with a wheeled cultivator frame and a plow beam supported at its forward end by the frame for both vertical and lateral swinging movement of a manually operable member supported by the frame for vertical movement and for turning movement and a lifting arm rigid with the lower end of said member and having sliding engagement with the beam whereby lifting of the member will raise the beam and turning of the member will swing the beam laterally.

11. In a cultivator attachment the combination with a cultivator including a frame, and plow beams supported at their forward ends by the frame for both lateral and vertical swinging movement, of hand levers each supported by the frame and having sliding engagement with the beams whereby any movement of the hand levers will cause corresponding movement of the beams.

12. In an attachment for cultivators the combination with a wheeled cultivator including a frame, and plow beams supported at their forward ends by the frame for swinging movement toward and away from each other and for swinging movement up and down, of hand levers supported by the frame and having operative engagement with the beams whereby any movement of either hand lever will cause corresponding movement of its beam, and means applicable to the levers for locking them in adjusted spaced relation to each other.

13. In an attachment for cultivators the combination with a wheeled cultivator including a frame, and plow beams supported at their forward ends by the frame for swinging movement toward and away from each other and for swinging movement up and down, of hand levers supported by the frame and having operative engagement with the beams whereby any movement of either hand lever will cause corresponding movement of its beam, and means applicable to the levers for locking them in adjusted spaced relation to each other, said means including pins projecting upwardly from the levers and a hobble bar formed adjacent each end with a series of openings adapted to receive the pins.

In testimony whereof I affix my signature.

GEORGE W. GENTRY. [L. S.]

Copies of this patent may be obtained for five cents each, by addressing the "Commissioner of Patents, Washington, D. C."